United States Patent
Cole

(10) Patent No.: US 7,131,626 B2
(45) Date of Patent: Nov. 7, 2006

(54) MOLD FOR THE MAKING OF A HAND-HOLDABLE EDIBLE FOOD PRODUCT

(76) Inventor: Lawrence A. Cole, 4 Gull Point Rd., Monmouth Beach, NJ (US) 07750

( * ) Notice: Subject to any disclaimer, the term of this patent is extended or adjusted under 35 U.S.C. 154(b) by 735 days.

(21) Appl. No.: 10/449,622

(22) Filed: Jun. 2, 2003

(65) Prior Publication Data

US 2004/0241298 A1    Dec. 2, 2004

(51) Int. Cl.
*A21B 5/02* (2006.01)
(52) U.S. Cl. .................. 249/115; 425/470; 426/514; 99/428
(58) Field of Classification Search ............ 249/115, 249/117; 425/470; 426/94, 391, 512, 514
See application file for complete search history.

(56) References Cited

U.S. PATENT DOCUMENTS

| 534,957 | A | * | 2/1895 | Ingraham | 220/62 |
| 3,410,691 | A | * | 11/1968 | Stanley | 426/94 |
| 4,463,021 | A | * | 7/1984 | Eufemia | 426/90 |
| 4,929,458 | A | * | 5/1990 | Smietana | 426/391 |
| 5,499,914 | A | * | 3/1996 | Rist | 425/470 |
| 6,780,453 | B1 | * | 8/2004 | Smith | 426/523 |

* cited by examiner

*Primary Examiner*—Donald Heckenberg
(74) *Attorney, Agent, or Firm*—Charles I. Brodsky

(57) ABSTRACT

A mold having an upper end and a downwardly extending wall terminating in a lower end, and a continuous notch spanning across the wall extending upwardly from the lower end, with both an outside surface of the wall and an inside surface being of a coating which is non-stick to dough wrapped around the outside surface of the mold and to dough which is pushed downwardly through the notch from the upper end of the mold towards its lower end.

6 Claims, 4 Drawing Sheets

MOLD FOR THE MAKING OF A HAND-HOLDABLE EDIBLE FOOD PRODUCT

CROSS-REFERENCE TO RELATED APPLICATIONS

NONE

Statement Regarding Federally Sponsored Research or Development

Research and development of this invention and Application have not been federally sponsored, and no rights are given under any Federal program.

Reference to a Microfiche Appendix

NOT APPLICABLE

BACKGROUND OF THE INVENTION

1. Field of the Invention

This invention relates to edible, hand-held personal food containers, in general, and to an edible cone receiving a pizza filling therein, in particular.

2. Description of the Related Art

As set out in U.S. Pat. No. 4,463,021, pie-shaped slices of pizza sold to customers on an individual piece basis are somewhat unsatisfactory as a hand-held edible food product to eat while standing or walking because of the flexible and unstable nature of the pizza slice. To deal with that, a pizza cone is there proposed as including an insulating cup-like cover telescoped over the lower end of the cone, to maintain the structural integrity of the cone and to catch any leakage or drippage from the cone that might otherwise occur.

Experience has shown, however, that such pizza cone leaves much to be desired, unless only a small amount of pizza filling is spooned into the cone to begin with. Once the amount of filling added equals that normally included on a pizza slice, the combination of its weight and its moisture content weakens the structural integrity of the cone, causing it to leak and eventually fall apart as the consumer bites into it. Also, attempting to add such heavier and more liquid fillings as meatballs, chili and stews for walk-around eating further worsens the structural integrity problems of the cone. Yet, benefits attendant to having available an edible, hand-held personal food container continues—for standing, walking and the like while shopping in a mall or at a boardwalk or stadium (as well as for home consumption or as a purchasable item at a neighborhood pizzeria).

Recognizing that the shape of the cone is not very material, and that its size is not really relevant, the present invention proceeds with the understanding that certain consumers are slow eaters and some prefer heavier weight fillings; but, that all agree the support of the cone has to last until the last bite is taken. Whether the filling of the cone is mozzarella cheese and tomato sauce alone, whether it be supplemented with pepperoni, sausage, anchovies or meatballs, or whether a filling such as beef and peppers, sausage and onions, or anything else is added, the weight and moisture content of the food has to be supported by the structure of the cone as one continues to eat it.

SUMMARY OF THE INVENTION

As will become clear from the description that follows, the edible, hand-held personal food container of one embodiment of the invention employs an edible cone having a downwardly extending wall terminating in the open upper end of the cone and in its closed lower end. At the same time, the wall forms a cavity to receive the food filling by inwardly spiralling from an outside surface of the cone. In so doing, the cavity serves as an intermediate baffle divider, receiving the food filling on its opposing sides, as between the folds formed within the cavity by the spiralling of the downwardly extending wall. As will be seen, the food filling is supported between a first fold formed within the cavity by one of a clockwise and counter-clockwise direction spiralling, and between a second fold formed within the cavity by the spiralling in the other of the clockwise and counter-clockwise directions. With the edible cone composed of a pizza dough manufacture, for example, the first of these two folds is sealed, by water or an "egg-wash" composition, while the second fold is sealed by a "hand-press" positioning. In accordance with a preferred manufacture, the edible cone is baked at a temperature of substantially 425° F. for approximately eight minutes. When baked in an oven in this manner, the edible cone is baked with its closed lower end facing up.

In a second embodiment of the invention, the edible cone will be seen to form a cavity with at least one intermediate edible baffle divider extending lengthwise therein for receiving the food filling on opposite sides of the baffle. This baffle extends lengthwise within the cone a distance less than that between the upper and lower ends of the cone; and, in essence, forms one side of a food filling pocket within the edible cone, an opposite side of which is sealed to the inside surface of the wall. When sealed by this water or "egg-wash" composition, for example, the baffle-side of the receiving pocket moves freely but with the food filling again being provided on both sides of the divider.

As previously mentioned, the edible, hand-held personal food containers of the invention can be purchased on an individual basis at a concession or pizzeria. Alternatively, they can be purchased frozen from a food market for subsequent home cooking, as in a microwave oven. The manners of such preparations are discussed in the paragraphs that follow along with illustrations helpful in an understanding of how such preparations may be carried out. In all cases, however, the baffle dividers maintain the stability and sturdiness of the edible cone shape in supporting the weight and moisture content of the food filling added—while, at the same time, reducing somewhat the amount of food that can be spooned into the cavity so that the integrity of the cone shape is retained as one eats through it to the bottom.

BRIEF DESCRIPTION OF THE DRAWINGS

These and other features of the present invention will be more clearly understood from a consideration of the following description, taken in connection with the accompanying Drawings, in which.

DETAILED DESCRIPTION OF THE INVENTION

Figure 1:
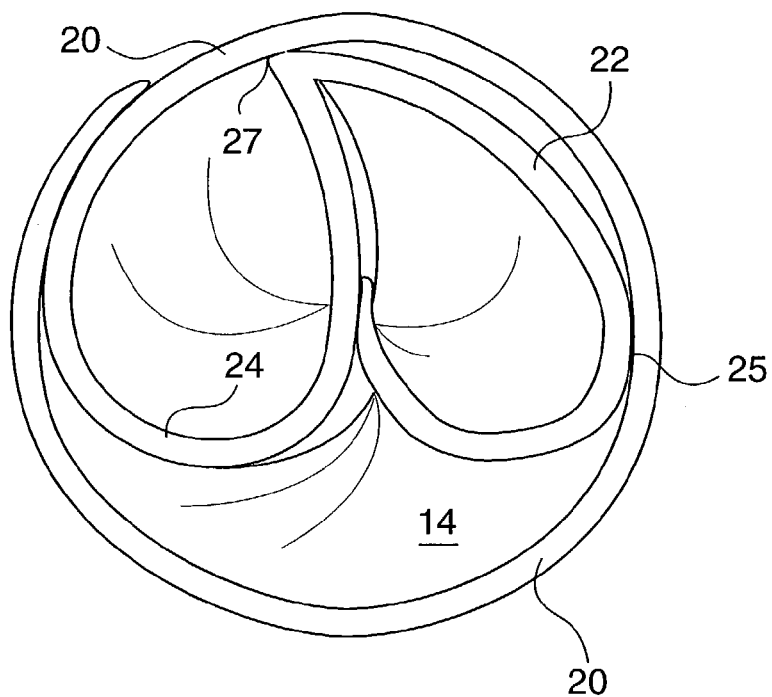
FIG. 1 is a top view of an edible, hand-held personal food container constructed in accordance with a first embodiment of the invention.

As will become clear from the following description, one feature of the hand-holdable edible food product of the invention is the inclusion of an intermediate baffle divider formed within the food receiving cavity which adds support to the structural integrity of the cone when extending upwardly from its closed lower end. While the support to the food filling material could be enhanced by having the baffle extend downwardly from the upper end, having it extend from the lower end, instead, continues to provide the required structural support as the consumer continues to eat the cone from its top down to its bottom. While optimum integrity follows from having the baffle extend entirely from the lower end to the upper end, testing has shown that such length is not required since the consumer begins to eat into the cone almost immediately upon purchasing it. Such testing has similarly shown that the integrity is enhanced through the inclusion of just a single intermediate baffle—and while additional baffles may provide even greater support, they are not generally required.

In accordance with the invention, the hand-holdable edible food product—like the pizza cone of U.S. Pat. No. 4,463,021—is composed of a pizza dough manufacture. Baked at a temperature of substantially 425° F. for approximately eight minutes—and preferably in an oven with the closed lower end of the product facing up—, this edible cone is then allowed to cool approximately four minutes before receiving its food filling. This filling could be such a pizza filling manufacture as mozzarella cheese and tomato sauce (alone or as conventionally supplemented) or of most any other food filling that might be desired. In such manner, the edible cone may then be frozen after baking for supermarket sales for example, packaged 8 to a box. At stadium and other concession places of sales, on the other hand, the food filling may be added to the cone shortly after, and then the cone reheated for handing to the patron in a paper or cardboard holder of a type shown by the reference numeral 10 in FIG. 7, reference numeral 12 in FIGS. 3 and 6 being understood to be a representation of the edible food product container of the invention sized to fit into the holder 10. As will be evident, after the edible food product container has sufficiently cooled, the holder 10 could be discarded. Any appropriate "stand" could be utilized adjacent the sales' counter or heating oven in this latter respect, to hold any numbers of such cones awaiting purchase in much the same manner as individual pie-shaped pizza slices lay on a circular tray awaiting selection by the purchaser for subsequent heating. When heating the cone and its filling just before eating, the closed lower end of the cone is arranged "lower end down", while in its manufacture, the cone is preferably baked "lower end up".

Figure 2:
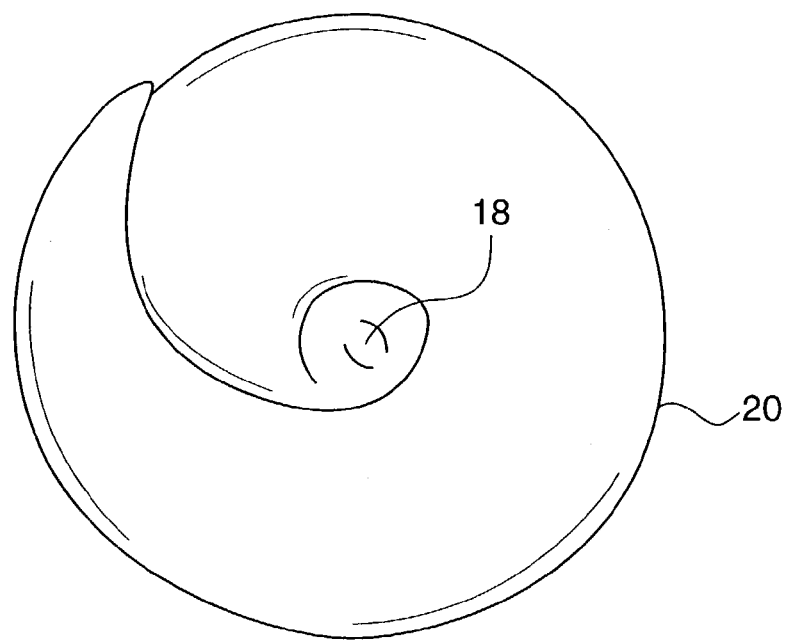
FIG. 2 is a bottom view of the personal food container of FIG. 1.
Figure 3:
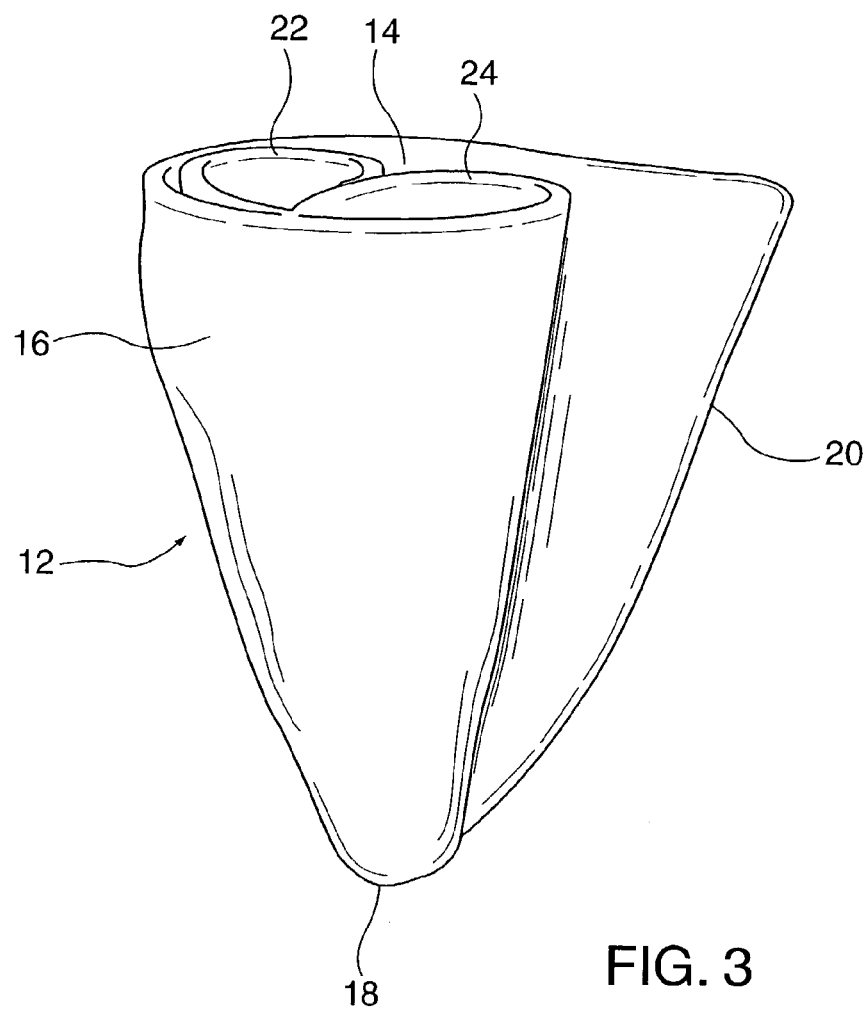
FIG. 3 is a partial perspective view helpful in an understanding of the composition of the edible personal food container of this first embodiment.

One embodiment of the hand-holdable edible cone of the invention is illustrated by the drawing of FIGS. 1–3. In this construction, the cone 12 has an open upper end 14 and a downwardly extending wall 16 which terminates in a closed lower end 18. As more particularly shown in FIGS. 1 and 3, the wall 16 forms a cavity to receive the food filling by spiralling from an outside surface 20 of the cone 12 inwardly thereof. The food filling added to the cavity then can be spooned between a first fold 22 formed within the cavity by spiralling in one of a clockwise and counterclockwise direction, and between a second fold 24 formed by a spiralling in the other of a clockwise and counterclockwise direction—with FIGS. 1 and 3 showing the fold 22 formed clockwise, and the fold 24 being formed counterclockwise. With the cone being composed of a pizza dough manufacture, the first fold 22 may be sealed by an "egg-wash" composition at 25, while the second fold 24 may be sealed by a "hand-press" positioning at 27. The folds 22, 24 form baffle dividers for receiving the food filling spooned in on their opposite sides, in providing the support for the weight and moisture content of the food filling added—and being formed of the same pizza dough manufacture, they are themselves edible along with the cone and with its filling. Because of their inclusion within the cavity, the amount of food that could be spooned in is reduced somewhat, but not to such an extent as would be noticed by the consumer—eating, in this manner, an additional layer of crust of the cone composition.

Figure 4:
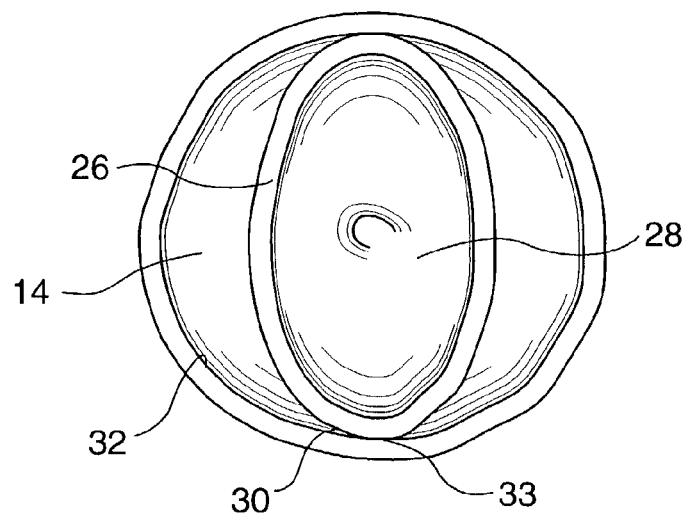
FIG. 4 is a top view of an edible, hand-held personal food container constructed in accordance with a second embodiment of the present invention.
Figure 5:
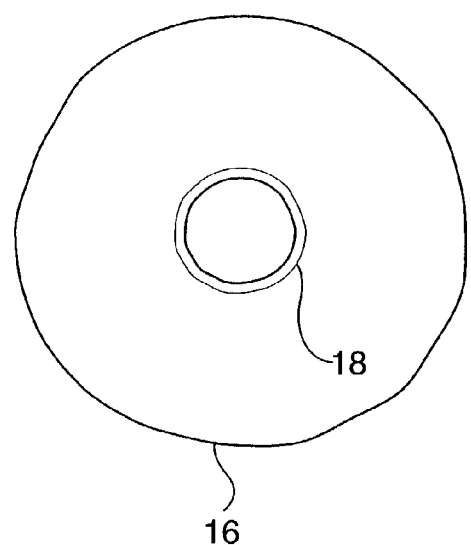
FIG. 5 is a bottom view of the container of FIG. 4.
Figure 6:
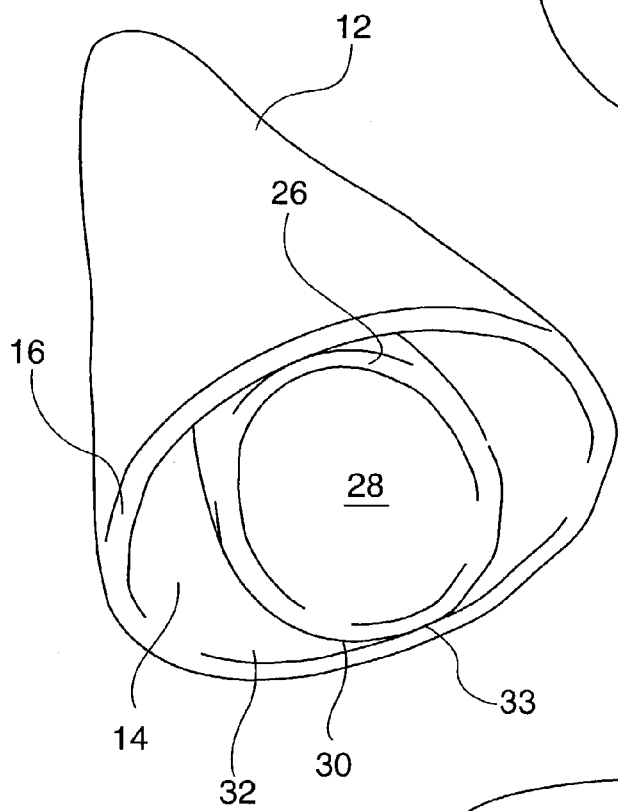
FIG. 6 is a partial perspective view helpful in an understanding of composition of the edible personal food container of this second embodiment.

FIGS. 4–6 illustrate a second embodiment of the hand-holdable edible food product constructed in accordance with the invention. Here, the baffle divider 26 forms one side of a food filling receiving pocket 28 within the edible cone 12, an opposite side 30 of which is sealed to an inside surface 32 of the downwardly extending wall 16 at 33. (When again composed of the same pizza dough composition as is the cone 12 itself, the opposite side 30 of the pocket 28 could be sealed to the inside surface 32 by an "egg-wash" composition.) The pizza or other filling spooned into the cone 12 then fills the pocket 28, and around the outside of the baffle 26 in filling the remainder of the cone 12. Again, added structural support is provided by the thickness of the baffle 26 and the opposite side 30 in supporting the weight of the filling and in absorbing its moisture content. As with the embodiment of FIGS. 1–3, the embodiment of FIGS. 4–6 is one where the downwardly extending wall 16 forms the upper and lower ends 14, 18 of the cone product, with the baffle divider extending upwardly from the lower end 18. As best shown in FIG. 6, the baffle 26 and the opposite side 30 forming the pocket 28 extend upwardly less than the distance that between the upper and lower ends of the cone 12.

Figure 7:
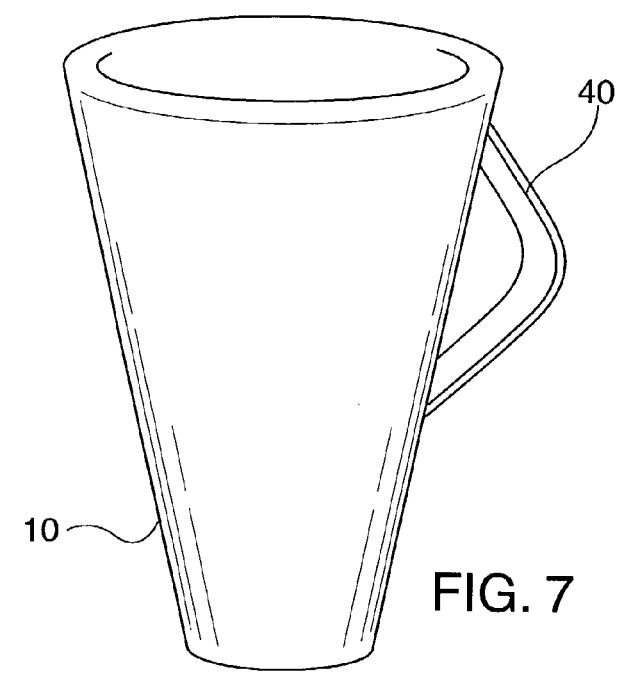
FIG. 7 is a pictorial view helpful in an understanding of one manner of point of sales presentation for the edible, personal food containers of FIGS. 3 and 6.

The holder 10 of FIG. 7 into which either the container of FIGS. 1–3 or 4–6 may fit can, of course, be provided with or without a handle 40. All that it is necessary is that the holder act as a "sleeve", so that the heated cone does not burn the fingers or hand, and so that any leakage of food filling is caught. In those instances where supermarket sales are contemplated for prepared cones filled with sausage, pepperoni, cheese, etc., the cones, once so filled may be sealed in any appropriate plastic wrap for freshness until cooked. Such plastic wrapping could, in turn, be over a cup or like container in which the edible cone is itself to be heated, with a provided cover then being removable once the heated cone is placed on the table for eating. To facilitate this, the open upper end 14 of the cone could be provided with a bordering rim 34 to hold the contents in until the cone is bitten into. The same could apply for cones purchasable at counter sales Besides being easier to walk around with while eating than an individual flat pie-shaped pizza slice, the cones of the invention last longer, and with less tendency to drip than with anything presently available. Because of the added support, more food product could be added than on a conventional pizza slice, and once rolled up, could cook easily in a microwave oven in its appropriate stand. Evaluation has shown that even when just filled with a typical pizza mixture, a unit sales price could be comparable to that for individual pizza slice sales; on the other hand, the teachings of the invention will be seen to extend beyond just "pizza fillings", but to other types of chili, beef, sausage products, etc. whose weight and moisture content presently defy attempts to eat them from a cone without mess while casually walking about.

Whereas each embodiment of the hand-holdable product of the invention affords these described advantages, their different constructions allow for different methods of their manufacture. With the pizza dough composition typically being one of flour, water, salt and yeast, the embodiment of FIGS. 1–3 could be made by rolling the dough out flat, and layering it as desired with mozzarella cheese, tomato sauce, peppers, anchovies, mushrooms, etc.—and then rolling over the dough over by spiralling for baking in the oven. As will be appreciated, this can more easily be done at a pizzeria, at a concession stand, or at a factory packaging the cones for mass supermarket distribution, rather than at a kitchen counter at home. The embodiment of FIGS. 4–6, on the other hand, could easily be made at home, using the mold of FIGS. 8A and 8B, embodying yet another aspect of the invention.

Figure 8A:
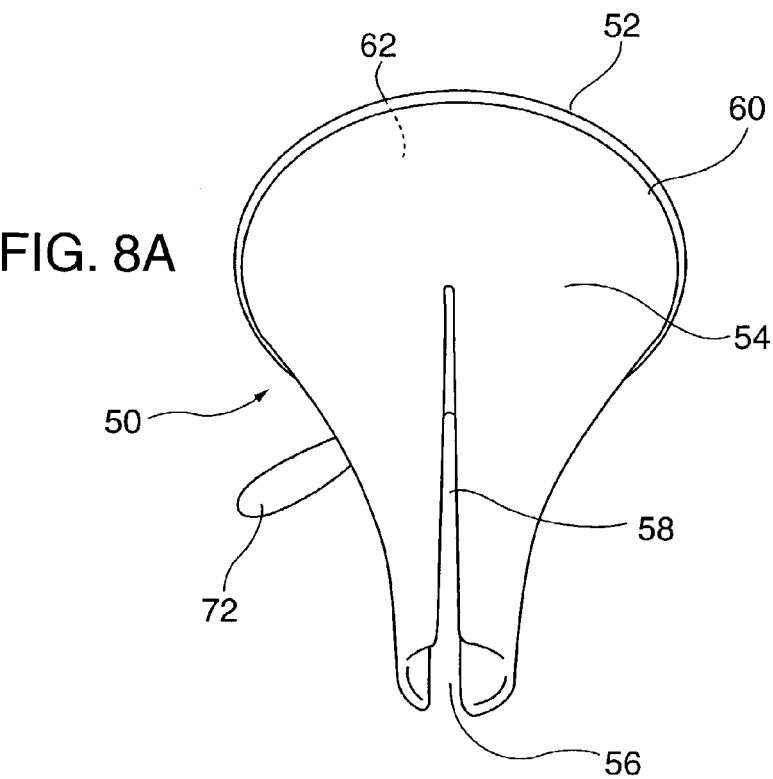
FIGS. 8A and 8B are inverted front views pictorially illustrating a manner of utilizing a mold to manufacture the edible personal food container of FIG. 6.
Figure 8B:
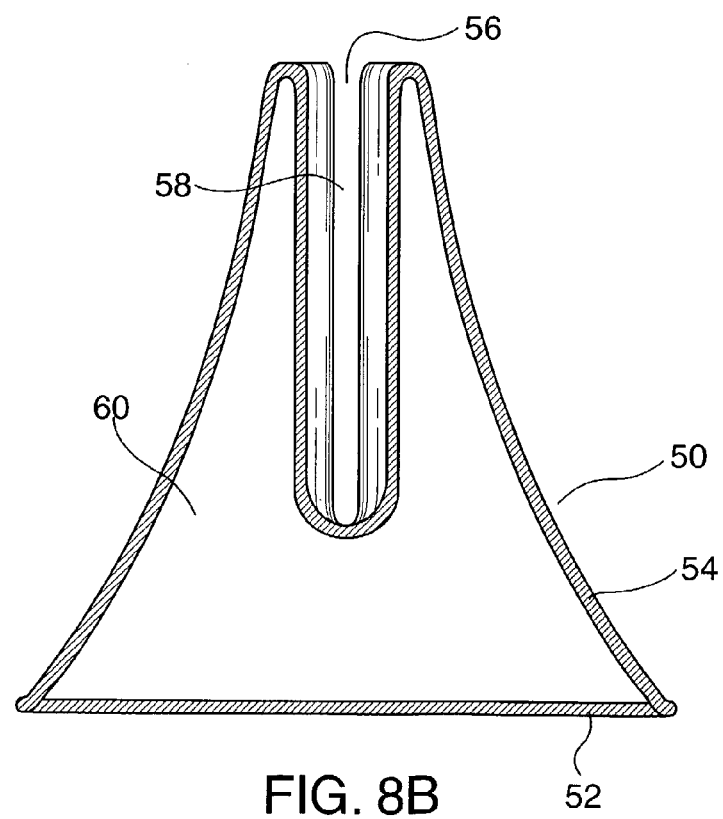

The mold of FIGS. 8A and 8B shown at 50 includes an open upper end 52 and a downwardly extending wall 54 terminating in a lower end 56, with each end being of a given dimension measured horizontally. For the typical configuration of the food product in the nature of a "cone", the upper end 52 would then be of a dimension measured horizontally which is greater than that horizontal dimension for the lower end 56. As illustrated, a continuous notch 58 spans across the wall 54, extending upwardly from the lower end 56 towards the upper end 52. The outside surface 60 of the wall 54 is of a coating which is non-stick to the pizza dough which is to be wrapped around it, while the inside surface 62 of the wall 54 is of a coating which is non-stick to dough which is pushed downwardly through the notch 58 from the upper end 52 towards the lower end 56. A pizza dough cone as shown in FIG. 6 could thus be removed, to be thereafter baked, and then frozen for later use to receive the food filling. Alternatively, of course, the cone of FIG. 6 could be spooned with filling directly, and then baked together. In forming the pocket 28 into which the filling is to be added, one side of the dough pushed through the notch 58 could be sealed by "egg-wash" to the inside surface of the cone, as shown at 33, with the filling, when cooking, being both within the pocket 28 and around the baffle divider 26 so formed.

Where the mold 50 is composed of a metallic fabrication, a non-heat retaining handle 72 could be secured with the outside surface 60. In such manufacture, an appropriate non-stick coating of TEFLON (poloytetrafluoroethylene) could be employed for the outside surface 60 and for the inside surface 62. The notch 58 is shown as extending upwardly from the lower end 56 a distance less than the distance between the lower end 56 and the upper end 52.

As will be evident, this type of mold could be sold singly, or as groupings of one, two, three or more extending from a unitary base. In this way,—especially where the individual molds are clipped or otherwise temporarily secured with the base—individual molds could be separated for baking any numbers of the food product container, or for cooking them together with the individual pizza or other filling desired.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. A mold for the making of a hand-holdable edible food product comprising:

an open upper end of a first dimension measured horizontally and a downwardly extending wall terminating in a closed lower end of a second dimension measured horizontally; and a continuous notch spanning across said wall extending upwardly from said lower end toward said upper end;

with an outside surface of said wall being of a coating which is non-stick to dough wrapped therearound, and with an inside surface of said wall being of a coating which is non-stick to dough pushed through said notch downwardly from said upper end toward said lower end.

2. The mold of claim 1 composed of a metallic fabrication with a non-stick plastic coating on said inside and outside surfaces of said wall.

3. The mold of claim 2 wherein said non-stick plastic coating is of TEFLON(polytetrafluoroethylene).

4. The mold of claim 2, including a non-heat retaining handle secured with said outside surface of said wall.

5. The mold of claim 1 for the making of an edible food product cone in which said second dimension measured horizontally is less than said first dimension measured horizontally.

6. The mold of claim 1 wherein said continuous notch extends upwardly across said wall a distances less than the distance between said upper and lower ends of said mold.

* * * * *